United States Patent
Li et al.

(10) Patent No.: US 10,999,798 B2
(45) Date of Patent: May 4, 2021

(54) EFFICIENT SCAN AND SERVICE DISCOVERY

(71) Applicant: Apple Inc., Cupertino, CA (US)

(72) Inventors: Guoqing Li, Cupertino, CA (US); Yong Liu, Campbell, CA (US); Oren Shani, Saratoga, CA (US); Christiaan A. Hartman, San Jose, CA (US); Xiaowen Wang, Cupertino, CA (US); Christian W. Mucke, Cupertino, CA (US); Tushar R. Shah, Cupertino, CA (US); Jarkko L. Kneckt, Los Gatos, CA (US); Matthew L. Semersky, San Jose, CA (US); Yoel Boger, Shoham (IL); Josef Peery, Kadima (IL); Rajneesh Kumar, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 170 days.

(21) Appl. No.: 16/013,697

(22) Filed: Jun. 20, 2018

(65) Prior Publication Data
US 2018/0376419 A1    Dec. 27, 2018

Related U.S. Application Data

(60) Provisional application No. 62/524,764, filed on Jun. 26, 2017.

(51) Int. Cl.
*H04W 52/02* (2009.01)
*H04W 84/12* (2009.01)

(52) U.S. Cl.
CPC ... *H04W 52/0229* (2013.01); *H04W 52/0222* (2013.01); *H04W 52/0235* (2013.01);
(Continued)

(58) Field of Classification Search
CPC ................ H04W 52/02–0235; Y02D 30/70
See application file for complete search history.

(56) References Cited

U.S. PATENT DOCUMENTS 9,107,164 B1    8/2015   Troyanker
9,749,958 B1 *  8/2017   Segev ............... H04W 52/0235
(Continued)

OTHER PUBLICATIONS

Extended Search Report, European Application No. 18179659.0-1219, dated Nov. 6, 2018, 8 pages.

*Primary Examiner* — Marcus Smith
(74) *Attorney, Agent, or Firm* — Kowert, Hood, Munyon, Rankin & Goetzel, P.C.

(57) ABSTRACT

An interface circuit in an electronic device (such as an access point) may provide a wake-up beacon to a recipient electronic device. During operation, the interface circuit may provide a wake-up beacon associated with a predefined sub-channel in one or more channels in a band of frequencies, where the wake-up beacon is for a wake-up radio in the recipient electronic device. Moreover, the wake-up beacon may be provided within an associated time interval, such as a keep-alive interval of the electronic device. In some embodiments, the wake-up beacon includes a field with channel information that specifies one or more second channels used by a main radio in the recipient electronic device. Alternatively or additionally, the wake-up beacon may include a field with service information that specifies one or more types of services and/or a field with information specifying a transmit power of the interface circuit.

20 Claims, 12 Drawing Sheets

(52) U.S. Cl.
CPC ........ *H04W 52/0274* (2013.01); *H04W 84/12* (2013.01); *Y02D 30/70* (2020.08)

(56) References Cited

U.S. PATENT DOCUMENTS

| | | | |
|---|---|---|---|
| 9,883,473 B2 | 1/2018 | Azizi | |
| 2014/0050133 A1* | 2/2014 | Jafarian | H04W 52/0235 |
| | | | 370/311 |
| 2014/0086124 A1* | 3/2014 | Knowles | H04W 52/0225 |
| | | | 370/311 |
| 2016/0128128 A1 | 5/2016 | Ang | |
| 2016/0278013 A1* | 9/2016 | Shellhammer | H04W 84/12 |
| 2016/0366644 A1 | 12/2016 | Ghosh | |
| 2016/0374019 A1 | 12/2016 | Park | |
| 2017/0026907 A1* | 1/2017 | Min | H04W 52/0254 |
| 2017/0111858 A1 | 4/2017 | Azizi | |
| 2017/0280498 A1 | 9/2017 | Min | |
| 2018/0041961 A1* | 2/2018 | Huang | H04W 52/0216 |
| 2018/0084501 A1 | 3/2018 | Mu | |
| 2018/0309538 A1* | 10/2018 | Verma | H04W 52/0235 |
| 2018/0310198 A1* | 10/2018 | Zhou | H04W 28/0221 |
| 2019/0246356 A1* | 8/2019 | Kim | H04W 76/11 |
| 2019/0253965 A1* | 8/2019 | Gan | H04W 88/08 |

\* cited by examiner

EFFICIENT SCAN AND SERVICE DISCOVERY

CROSS-REFERENCE TO RELATED APPLICATION

This application claims the benefit of U.S. Provisional Application No. 62/524,764, entitled "Efficient Scan and Service Discovery, by Guoqing Li, et al., filed Jun. 26, 2017, the contents of which are hereby incorporated by reference.

FIELD

The described embodiments relate, generally, to wireless communications among electronic devices, and techniques for scanning for beacons in one or more predefined sub-channels using a low-power wake-up radio.

BACKGROUND

Many electronic devices communicate with each other using wireless local area networks (WLANs), such as those based on a communication protocol that is compatible with an IEEE 802.11 standard (which is sometimes referred to as 'Wi-Fi'). However, a radio in an electronic device that communicates using wireless communication in a WLAN may consume a significant amount of power.

In order to address this challenge, a new radio technology called Low Power Wake Up Radio (LP-WUR) is being considered. The LP-WUR may be a companion to the main Wi-Fi radio in the electronic device. Notably, by using the LP-WUR, the electronic device may turn off its main radio and may wake up the main radio in response to the LP-WUR receiving an LP-WUR packet from an access point. For example, the access point may send the LP-WUR packet when there is a down-link packet for the electronic device.

However, the connection to the access point may be lost while the main radio is in a low-power operating mode. For example, the electronic device may roam outside of the range of the access point and, thus, may need to transition to another access point. When this occurs, the electronic device may need to awaken the main radio, and then may need to perform network/service discovery. The network/service discovery typically involves the main radio scanning through multiple channels, and performing multiple frame exchanges. Each scan may take, e.g., 100 ms to capture a beacon from the other access point. Moreover, after the beacon is received, the electronic device and the other access point may need to exchange: a probe request and response, an authentication request and response, an association request and response and/or a service-information request and response. Waking up the main radio to perform the scan and to exchange these frames may increase the power consumption and may delay the operation of the electronic device.

SUMMARY

A first group of embodiments relate to an electronic device that provides a wake-up beacon. This electronic device may include a node that can be communicatively coupled to an antenna, and an interface circuit communicatively coupled to the node and that communicates with a recipient electronic device. During operation, the interface circuit provides, to the node, a wake-up beacon associated with a predefined sub-channel in one or more channels in a band of frequencies, where the wake-up beacon is for a wake-up radio in the recipient electronic device. Moreover, the wake-up beacon may be provided within an associated time interval.

Note that the electronic device may include an access point.

Moreover, the wake-up beacon may include a Low Power Wake Up Radio (LP-WUR) packet. Furthermore, the wake-up beacon may be compatible with an IEEE 802.11 communication protocol.

Additionally, the time interval may correspond to a keep-alive interval of the electronic device and/or the recipient electronic device. In some embodiments, the wake-up beacon includes a field with channel information that specifies one or more second channels used by a main radio in the recipient electronic device. Note that the one or more second channels may be different from the one or more channels.

Alternatively or additionally, the wake-up beacon may include a field with service information that specifies one or more types of services. For example, the service information may be hashed using a predefined hash function and/or the service information may include vendor information.

In some embodiments, prior to providing the wake-up beacon, the interface circuit: receives, from the node, a wake-up request associated with the recipient electronic device that specifies one or more types of services for which the recipient electronic device will awaken the main radio; and provides, to the node, a wake-up response associated with the recipient electronic device based at least in part on the wake-up request.

Moreover, the interface circuit may provide, to the node, a wake-up packet for the recipient electronic device that includes information specifying one or more services offered by the electronic device.

Furthermore, the wake-up beacon may include a field with information specifying a transmit power of the interface circuit. The transmit power may be different from another wake-up beacon provided by the interface circuit.

Additionally, prior to providing the wake-up beacon, the interface circuit may provide, to the node, a packet for the electronic device that includes information specifying a transmit power of the interface circuit.

Note that the interface circuit may be configured to provide wake-up beacons periodically.

Other embodiments provide an interface circuit in the electronic device.

Still other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Still other embodiments provide a method for providing a wake-up beacon. The method includes at least some of the aforementioned operations performed by the interface circuit in the electronic device.

A second group of embodiments relate to the recipient electronic device that receives the wake-up beacon from the first group of embodiments. This recipient electronic device may include a node that can be communicatively coupled to an antenna, and an interface circuit communicatively coupled to the node and that communicates with the electronic device. The interface circuit may include the wake-up radio and the main radio. During operation, the wake-up radio receives, from the node, the wake-up beacon associated with the predefined sub-channel in one or more channels in the band of frequencies, where the wake-up beacon is associated with the electronic device, and the wake-up beacon is provided within the associated time interval. Then, the wake-up radio provides, to the main radio, a wake-up signal that transitions the main radio from a low-power mode to a higher-power mode based at least in part on the wake-up beacon.

In some embodiments, prior to receiving the wake-up beacon, the interface circuit: provides, to the node, the wake-up request associated with the electronic device that specifies the one or more types of services for which the recipient electronic device will awaken the main radio; and receives, from the node, the wake-up response associated with the electronic device based at least in part on the wake-up request.

Alternatively or additionally, the interface circuit may receive, from the node, the wake-up packet associated with the electronic device that includes the information specifying the one or more services offered by the electronic device.

Moreover, the recipient electronic device may determine a communication metric based at least in part on a transmit power of the wake-up beacon and a received signal strength associated with the wake-up beacon. Based at least in part on the communication metric, the wake-up radio may perform a scan for a second wake-up beacon associated with a second electronic device in a second predefined sub-channel in one or more second channels in a second band of frequencies.

Furthermore, prior to receiving the wake-up beacon, the interface circuit may receive, from the node, the packet associated with the electronic device that includes the information specifying the transmit power of the electronic device.

Additionally, when another wake-up beacon is not received within a subsequent time interval, the wake-up radio may perform a scan for the second wake-up beacon associated with the second electronic device in the second predefined sub-channel in the one or more second channels in the second band of frequencies.

Other embodiments provide an interface circuit in the recipient electronic device.

Still other embodiments provide a computer-readable storage medium for use with the interface circuit in the recipient electronic device. When program instructions stored in the computer-readable storage medium are executed by the interface circuit, the program instructions may cause the recipient electronic device to perform at least some of the aforementioned operations of the recipient electronic device.

Still other embodiments provide a method for receiving a wake-up beacon. The method includes at least some of the aforementioned operations performed by the interface circuit in the recipient electronic device.

A third group of embodiments relate to an electronic device that provides a wake-up beacon. This electronic device may include a node that can be communicatively coupled to an antenna, and an interface circuit communicatively coupled to the node and that communicates with a recipient electronic device. During operation, the interface circuit provides, to the node, a wake-up beacon for a wake-up radio in the recipient electronic device with information indicating that the recipient electronic device is to awaken a main radio to receive a beacon with dynamic frequency selection (DFS) information associated with a band of frequencies.

Other embodiments provide an interface circuit in the electronic device.

Still other embodiments provide a computer-readable storage medium for use with the interface circuit in the electronic device. When program instructions stored in the computer-readable storage medium are executed by the interface circuit, the program instructions may cause the electronic device to perform at least some of the aforementioned operations of the electronic device.

Still other embodiments provide a method for providing a wake-up beacon. The method includes at least some of the aforementioned operations performed by the interface circuit in the electronic device.

A fourth group of embodiments relate to the recipient electronic device that receives the wake-up beacon from the third group of embodiments. This recipient electronic device may include a node that can be communicatively coupled to an antenna, and an interface circuit communicatively coupled to the node and that communicates with the electronic device. The interface circuit may include the wake-up radio and the main radio. During operation, the wake-up radio receives, from the node, the wake-up beacon associated with the electronic device. Then, the wake-up radio provides, to the main radio, a wake-up signal that transitions the main radio from a low-power mode to a higher-power mode based at least in part on the wake-up beacon. Moreover, the main radio receives, from the node, a beacon associated with the electronic device that includes the DFS information associated with a band of frequencies.

Other embodiments provide an interface circuit in the recipient electronic device.

Still other embodiments provide a computer-readable storage medium for use with the interface circuit in the recipient electronic device. When program instructions stored in the computer-readable storage medium are executed by the interface circuit, the program instructions may cause the recipient electronic device to perform at least some of the aforementioned operations of the recipient electronic device.

Still other embodiments provide a method for receiving a wake-up packet. The method includes at least some of the aforementioned operations performed by the interface circuit in the recipient electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Note that like reference numerals refer to corresponding parts throughout the drawings. Moreover, multiple instances of the same part are designated by a common prefix separated from an instance number by a dash.

DETAILED DESCRIPTION

Figure 1:
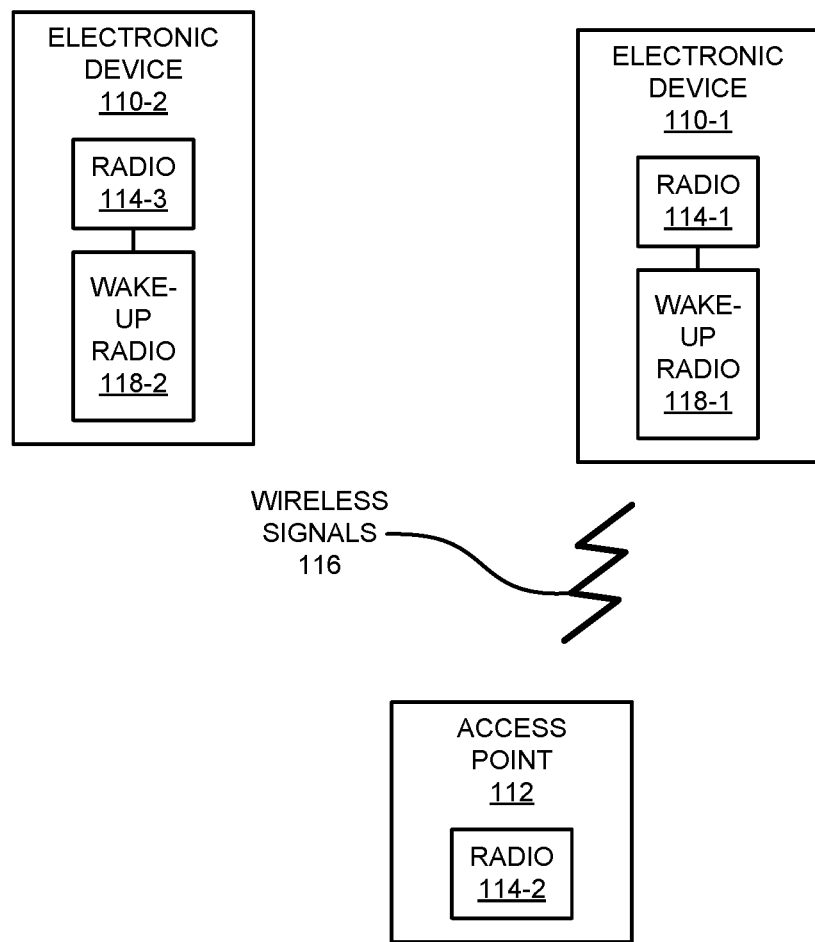
FIG. 1 is a block diagram illustrating an example of electronic devices communicating wirelessly.

An interface circuit in an electronic device (such as an access point) may provide a wake-up beacon to a recipient electronic device. During operation, the interface circuit may provide a wake-up beacon (such as a LP-WUR packet) associated with a predefined sub-channel in one or more channels in a band of frequencies, where the wake-up beacon is for a wake-up radio in the recipient electronic device. Moreover, the wake-up beacon may be provided within an associated time interval, such as a keep-alive interval of the electronic device.

In some embodiments, the wake-up beacon includes a field with channel information that specifies one or more second channels used by a main radio in the recipient electronic device. Note that the one or more second channels may be different from the one or more channels. Alternatively or additionally, the wake-up beacon may include a field with service information that specifies one or more types of services and/or a field with information specifying a transmit power of the interface circuit. The transmit power may be different from another wake-up beacon provided by the interface circuit. Moreover, the wake-up beacon may include information indicating that the recipient electronic device is to awaken a main radio to receive a beacon with DFS information associated with a band of frequencies.

Furthermore, the recipient electronic device may include an interface circuit that includes a wake-up radio (such as the LP-WUR) and a main radio. During operation, the wake-up radio may receive the wake-up beacon associated with the predefined sub-channel in one or more channels in the band of frequencies, where the wake-up beacon is associated with the electronic device, and the wake-up beacon is provided within the associated time interval. Then, the wake-up radio provides, to the main radio, a wake-up signal that transitions the main radio from a low-power mode to a higher-power mode based at least in part on the wake-up beacon. When a communication metric based at least in part on a transmit power of the wake-up beacon and a received signal strength associated with the wake-up beacon degrades, the wake-up radio may perform a scan for a second wake-up beacon associated with a second electronic device (such as a second access point) in a third predefined sub-channel in one or more third channels in a third band of frequencies. Alternatively, when another wake-up beacon is not received within a subsequent time interval, the wake-up radio may perform the scan for the second wake-up beacon.

By providing the wake-up beacon, this communication technique may maintain a connection between the electronic device and the recipient electronic device. Moreover, the communication technique may facilitate more efficient operation of the main radio. For example, the main radio may not be awakened as often and/or may not need to perform scans of the wireless environment of the recipient electronic device. Consequently, the communication technique may reduce power consumption and delays, and may improve the communication performance of the electronic device and/or the recipient electronic device. Thus, the communication technique may improve the user experience when using the electronic device or the recipient electronic device, and therefore may increase customer satisfaction and retention.

Note that the communication technique may be used during wireless communication between electronic devices in accordance with a communication protocol, such as a communication protocol that is compatible with an IEEE 802.11 standard (which is sometimes referred to as Wi-Fi). In some embodiments, the communication technique is used with IEEE 802.11BA and/or IEEE 802.11ax, which are used as illustrative examples in the discussion that follows. However, this communication technique may also be used with a wide variety of other communication protocols, and in electronic devices (such as portable electronic devices or mobile devices) that can incorporate multiple different radio access technologies (RATs) to provide connections through different wireless networks that offer different services and/or capabilities.

An electronic device can include hardware and software to support a wireless personal area network (WPAN) according to a WPAN communication protocol, such as those standardized by the Bluetooth® Special Interest Group (in Kirkland, Wash.) and/or those developed by Apple (in Cupertino, Calif.) that are referred to as an Apple Wireless Direct Link (AWDL). Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via different 3G and/or second generation (2G) RATs. In these scenarios, a multi-mode electronic device or UE can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'point' and 'user equipment' (UE) may be used herein to describe one or more consumer electronic devices that may be capable of performing procedures associated with various embodiments of the disclosure.

FIG. 1 presents a block diagram illustrating an example of electronic devices communicating wirelessly. Notably, one or more electronic devices 110 (such as a smartphone, a laptop computer, a notebook computer, a tablet, or another such electronic device) and access point 112 may communicate wirelessly in a WLAN using an IEEE 802.11 communication protocol. Thus, electronic devices 110 may be associated with access point 112. For example, electronic devices 110 and access point 112 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include the request and/or additional information, such as data, as payloads). Note that access point 112 may provide access to a network, such as the Internet, via an Ethernet protocol, and may be a physical access point or a virtual or 'software' access point that is implemented on a computer or an electronic device. In the discussion that follows, electronic devices 110 are sometimes referred to as 'recipient electronic devices.'

As described further below with reference to FIG. 12, electronic devices 110 and access point 112 may include subsystems, such as any/all of a networking subsystem, a memory subsystem, and/or a processor subsystem. In addition, electronic devices 110 and access point 112 may include radios 114, e.g., in the networking subsystems. More generally, electronic devices 110 and access point 112 can include (or can be included within) any electronic devices with networking subsystems that enable electronic devices 110 and access point 112 to wirelessly communicate with another electronic device. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 1, wireless signals 116 (represented by a jagged line) are communicated by radios 114-1 and 114-2 in electronic device 110-1 and access point 112, respectively. For example, as noted previously, electronic device 110-1 and access point 112 may exchange packets using a Wi-Fi communication protocol in a WLAN. As illustrated further below with reference to FIGS. 2-7, radio 114-1 may receive wireless signals 116 that are transmitted by radio 114-2. Alternatively, radio 114-1 may transmit wireless signals 116 that are received by radio 114-2. However, as described further below with reference to FIG. 8, radio 114-1 consumes additional power in a higher-power mode. If radio 114-1 remains in the higher-power mode even when it is not transmitting or receiving packets, the power consumption of electronic device 110-1 may be needlessly increased. Consequently, electronic devices 110 may include wake-up radios 118 that listen for and/or receive wake-up beacons (and/or other wake-up communications) from access point 112. When a particular electronic device (such as electronic device 110-1) receives a wake-up beacon, wake-up radio 118-1 may selectively wake up radio 114-1, e.g., provide a wake-up signal that selectively transitions radio 114-1 from a low-power mode to the higher-power mode.

During operation, access point 112 (such as radio 114-2) may determine whether to send a wake-up beacon to one or more recipient electronic devices (such as electronic device 110-1) with information that specifies that one or more recipient electronic devices are to transition from the low-power mode. For example, access point 112 may determine whether to send a wake-up beacon to electronic device 110-1 based at least in part on one or more types of services for which electronic device 110-1 previously indicated it will awaken radio 114-1 (such as in a wake-up request previously provided by electronic device 110-1 to access point 112). Then, radio 114-2 may provide a wake-up beacon (such as a LP-WUR packet) for the one or more recipient electronic devices (and, notably, for one or more wake-up radios 118). This wake-up beacon may be associated with a predefined sub-channel in one or more channels in a band of frequencies (e.g., radio 114-2 may transmit the wake-up beacon in the sub-channel), and the wake-up beacon may be provided within an associated time interval, such as a keep-alive interval of access point 112 (such as a keep-alive interval between, e.g., 1 and 10 s).

As described further below with reference to FIG. 9, the wake-up beacon may include a field with channel information that specifies one or more second channels used by radio 114-1 in electronic device 110-1. Note that the one or more second channels may be different from the one or more channels. Thus, the wake-up beacon may be used to keep or maintain a connection between electronic device 110-1 and access point 112 and to specify the one or more second channels for radio 114-1. Alternatively or additionally, as described further below with reference to FIG. 10, the wake-up beacon may include a field with service information that specifies one or more types of services. For example, the service information may be hashed using a predefined hash function and/or the service information may include vendor information. In these embodiments, the wake-up beacon may be used to alert electronic device 110-1 to downlink traffic associated with a service provided by or facilitated by access point 112, such as a service for which electronic device 110-1 may have previously indicated it wants to be awakened. Furthermore, as described further below with reference to FIG. 11, the wake-up beacon may include a field with information indicating that wake-up radio 118-1 is to awaken radio 114-1 to receive a beacon with DFS information associated with the band of frequencies (which may be the same of different than the band of frequencies associated with the wake-up beacon). This information may allow radio 114-1 to be awoken so that it can transition to one or more different channels when the band of frequencies includes a shared spectrum, thereby cleaning the band of frequencies for a higher-priority user.

After receiving the wake-up beacon, wake-up radio 118-1 may provide, to radio 114-1, a wake-up signal that transitions radio 114-1 from the low-power mode to the higher-power mode. Then, radio 114-1 may operate using the one or more second channels. Alternatively, when the information does not specify electronic device 110-1, wake-up radio 118-1 may take no further action, e.g., radio 114-1 may remaining in the low-power mode. More generally, in some embodiments after wake-up radio 118-1 receives the wake-up beacon, the wake-up radio 118-1 may analyze the information in the wake-up beacon to determine if radio 114-1 should transition from the lower power mode. Thus, in the embodiments, the 'intelligence' as to whether to transition from the low-power mode in the communication technique may be implemented by access point 112 (such as when access point 112 determines whether it will send the wake-up beacon to electronic device 110-1) and/or in electronic device 110-1 (which may analyze the information included in the wake-up beacon).

In some embodiments, electronic device 110-1 determines a communication metric based at least in part on a transmit power of the wake-up beacon and a received signal strength associated with the wake-up beacon. Note that the transmit power of the wake-up beacon may be specified by information included in the wake-up beacon. This may allow radio 114-2 to dynamically vary the transmit power in different instances of wake-up beacons provided by access point 112. Alternatively or additionally, radio 114-2 may have previously provided a packet to electronic device 110-1 that included information specifying a transmit power of radio 114-1 (in which case the transmit power may be quasi-static). Based at least in part on the communication metric, wake-up radio 118-1 may perform a scan for a second wake-up beacon associated with a second electronic device (such as a second access point) in a second predefined sub-channel in one or more third channels in a third band of frequencies. For example, wake-up radio 118-1 may scan for another access point in a different sub-channel in the same or different channel(s) and/or band of frequencies than those used by access point 112. In some embodiments, when another wake-up beacon is not received within a subsequent time interval, wake-up radio 118-1 performs a scan for the second wake-up beacon associated with the second electronic device in the third predefined sub-channel in the one or more third channels in the third band of frequencies.

Note that wake-up radio 118-1 may operate continuously or in a duty-cycle mode. For example, wake-up radio 118-1 may wake up to or transition to the higher-power mode from the low-power mode to receive the wake-up beacon. In some embodiments, radio 114-2 may provide wake-up beacons once, as needed (such as when there is downlink traffic) or periodically (such as within the associated time interval).

In these ways, the communication technique may allow electronic devices 110 and access point 112 to communicate efficiently (such as with low latency and high throughput) while significantly reducing the power consumption associated with radios 114 in electronic devices 110. These capabilities may improve the user experience when using electronic devices 110.

Note that access point 112 and at least some of electronic devices 110 may be compatible with an IEEE 802.11 standard that includes trigger-based channel access (such as IEEE 802.11ax). However, access point 112 and at least this subset of electronic devices 110 may also communicate with one or more legacy electronic devices that are not compatible with the IEEE 802.11 standard (i.e., that do not use multi-user trigger-based channel access). In some embodiments, at least a subset of electronic devices 110 use multi-user transmission (such as orthogonal frequency division multiple access or OFDMA). For example, radio 114-2 may provide a trigger frame for the subset of recipient electronic devices. This trigger frame may be provided after a time delay (such as a time delay between, e.g., 10 and 300 ms), so that radio 114-1 has sufficient time to transition to the higher-power mode. Moreover, after radio 118-1 receives the wake-up beacon and radio 114-1 transitions to the higher-power mode, radio 114-1 may provide a group acknowledgment to radio 114-2. Notably, radio 114-1 may provide the acknowledgment during an assigned time slot and/or in an assigned channel in the group acknowledgment. However, in some embodiments the one or more recipient electronic devices may individually provide acknowledgments to radio 114-2. Thus, after radio 118-1 receives the wake-up beacon and radio 114-1 transitions to the higher-power mode, radio 114-1 (and, more generally, the main radios in the one or more recipient electronic devices) may provide an acknowledgment to radio 114-2.

In the described embodiments, processing a packet or frame in one of electronic devices 110 and access point 112 includes: receiving wireless signals 116 encoding a packet or a frame; decoding/extracting the packet or frame from received wireless signals 116 to acquire the packet or frame; and processing the packet or frame to determine information contained in the packet or frame (such as data in the payload).

In general, the communication via the WLAN in the communication technique may be characterized by a variety of communication-performance metrics. For example, the communication-performance metric may include: a received signal strength (RSS), a data rate, a data rate for successful communication (which is sometimes referred to as a 'throughput'), a latency, an error rate (such as a retry or resend rate), a mean-square error of equalized signals relative to an equalization target, inter-symbol interference, multipath interference, a signal-to-noise ratio (SNR), a width of an eye pattern, a ratio of number of bytes successfully communicated during a time interval (such as a time interval between, e.g., 1 and 10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 1 as an example, in alternative embodiments, different numbers and/or types of electronic devices may be present. For example, some embodiments may include more or fewer electronic devices. As another example, in other embodiments, different electronic devices can be transmitting and/or receiving packets or frames.

Figure 2:
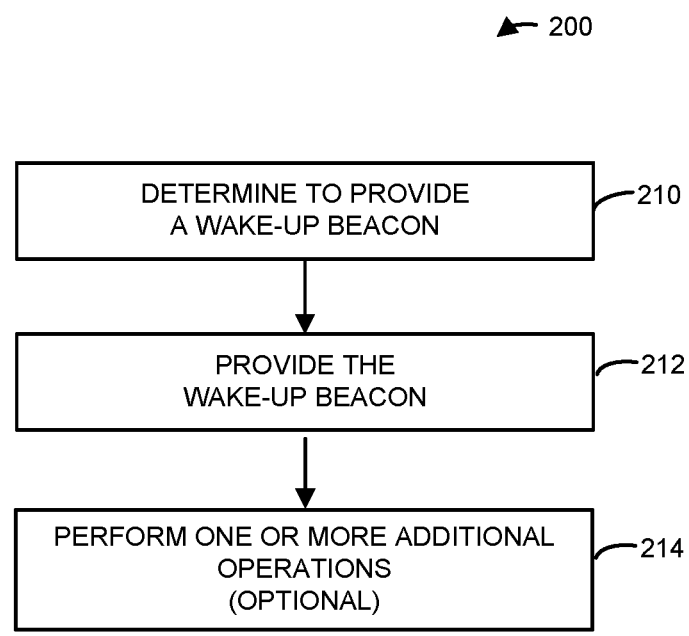
FIG. 2 is a flow diagram illustrating an example method for providing a wake-up beacon using one of the electronic devices in FIG. 1.

FIG. 2 presents a flow diagram illustrating an example method 200 for providing a wake-up beacon. This method may be performed by an electronic device, such as an interface circuit in access point 112 in FIG. 1. During operation, the interface circuit may determine to provide the wake-up beacon (operation 210) for a wake-up radio in a recipient electronic device. For example, the interface circuit may determine to provide the wake-up beacon when there is downlink traffic (such as data associated with a service) for the recipient electronic device. Then, the interface circuit may provide the wake-up beacon (operation 212) associated with a predefined sub-channel in one or more channels in a band of frequencies, where the wake-up beacon is provided within an associated time interval.

Note that the electronic device may include an access point. Moreover, the wake-up beacon may include a LP-WUR packet. Furthermore, the wake-up beacon may be compatible with an IEEE 802.11 communication protocol. Additionally, the time interval may correspond to a keep-alive interval of the electronic device and/or the recipient electronic device.

In some embodiments, the wake-up beacon includes a field with channel information that specifies one or more second channels used by a main radio in the recipient electronic device. Note that the one or more second channels may be different from the one or more channels. Alternatively or additionally, the wake-up beacon may include a field with service information that specifies one or more types of services. For example, the service information may be hashed using a predefined hash function and/or the service information may include vendor information.

Moreover, the interface circuit may be configured to provide wake-up beacons periodically.

In some embodiments, the interface circuit optionally performs one or more additional operations (operation 214). For example, prior to providing the wake-up beacon (operation 212), the interface circuit may: receive a wake-up request associated with the recipient electronic device (such as from the recipient electronic device) that specifies one or more types of services for which the recipient electronic device will awaken the main radio; and provide a wake-up response associated with the recipient electronic device (such as to the recipient electronic device) based at least in part on the wake-up request. Moreover, the interface circuit may provide a wake-up packet for the recipient electronic device that includes information specifying one or more services offered by the electronic device.

Furthermore, the wake-up beacon may include a field with information specifying a transmit power of the interface circuit. The transmit power may be different from another wake-up beacon provided by the interface circuit, such as a wake-up beacon that was previously provided by the interface circuit. Alternatively or additionally, prior to providing the wake-up beacon (operation 212), the interface circuit may provide a packet for the electronic device that includes information specifying a transmit power of the interface circuit.

Figure 3:
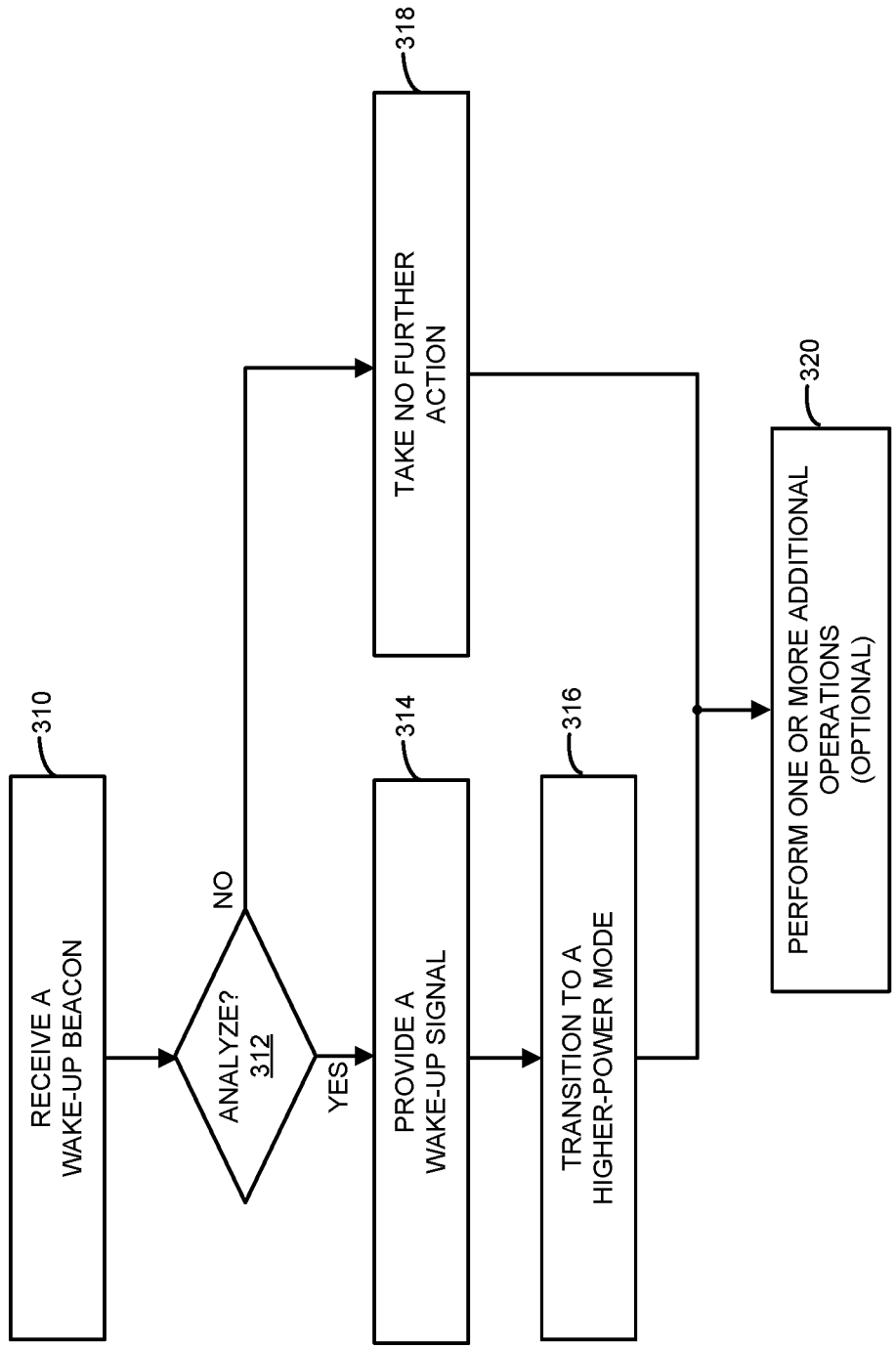
FIG. 3 is a flow diagram illustrating an example method for receiving a wake-up beacon using one of the electronic devices in FIG. 1.

FIG. 3 presents a flow diagram illustrating an example method 300 for receiving a wake-up beacon. This method may be performed by a recipient electronic device, such as an interface circuit in electronic device 110-1 in FIG. 1. This interface circuit may include a wake-up radio and a main radio. During operation, the wake-up radio may receive the wake-up beacon (operation 310) associated with the predefined sub-channel in one or more channels in the band of frequencies, where the wake-up beacon is associated with the electronic device (such as from the electronic device), and the wake-up beacon is provided within the associated time interval. Then, the wake-up radio may optionally analyze the wake-up beacon (operation 312) to determine whether to wake up the main radio. If yes (operation 312), the wake-up radio may provide, to the main radio, a wake-up signal (operation 314) that transitions (operation 316) the main radio from a low-power mode to a higher-power mode based at least in part on the wake-up beacon. Otherwise (operation 312), the wake-up radio may not take further action (operation 318).

In some embodiments, the interface circuit optionally performs one or more additional operations (operation 320). For example, prior to the wake-up radio receiving the wake-up beacon (operation 310), the main radio may: provide the wake-up request associated with the electronic device (such as to the electronic device) that specifies the one or more types of services for which the recipient electronic device will awaken the main radio; and receive the wake-up response associated with the electronic device (such as from the electronic device) based at least in part on the wake-up request. Alternatively or additionally, the main radio may receive the wake-up packet associated with electronic device (such as from the electronic device) that includes the information specifying the one or more services offered by the electronic device.

Moreover, the recipient electronic device may determine a communication metric based at least in part on a transmit power of the wake-up beacon and an RSS associated with the wake-up beacon. Based at least in part on the communication metric, the wake-up radio may perform a scan for a second wake-up beacon associated with a second electronic device (such as another access point) in a second predefined sub-channel in one or more second channels in a second band of frequencies.

Furthermore, prior to receiving the wake-up beacon (operation 310), the main radio may receive the packet associated with the electronic device (such as from the electronic device) that includes the information specifying the transmit power of the electronic device.

Additionally, when another wake-up beacon (such as a subsequent wake-up beacon) is not received within a subsequent time interval, the wake-up radio may perform a scan for the second wake-up beacon associated with the second electronic device in the second predefined sub-channel in the one or more second channels in the second band of frequencies.

In some embodiments of methods 200 (FIG. 2) and/or 300, there may be additional or fewer operations. Moreover, the order of the operations may be changed, and/or two or more operations may be combined into a single operation or performed at least partially in parallel.

In some embodiments, at least some of the operations in methods 200 (FIG. 2) and/or 300 are performed by an interface circuit in the electronic device. For example, at least some of the operations may be performed by firmware executed by an interface circuit, such as firmware associated with a MAC layer, as well as one or more circuits in a physical layer in the interface circuit.

Figure 4:
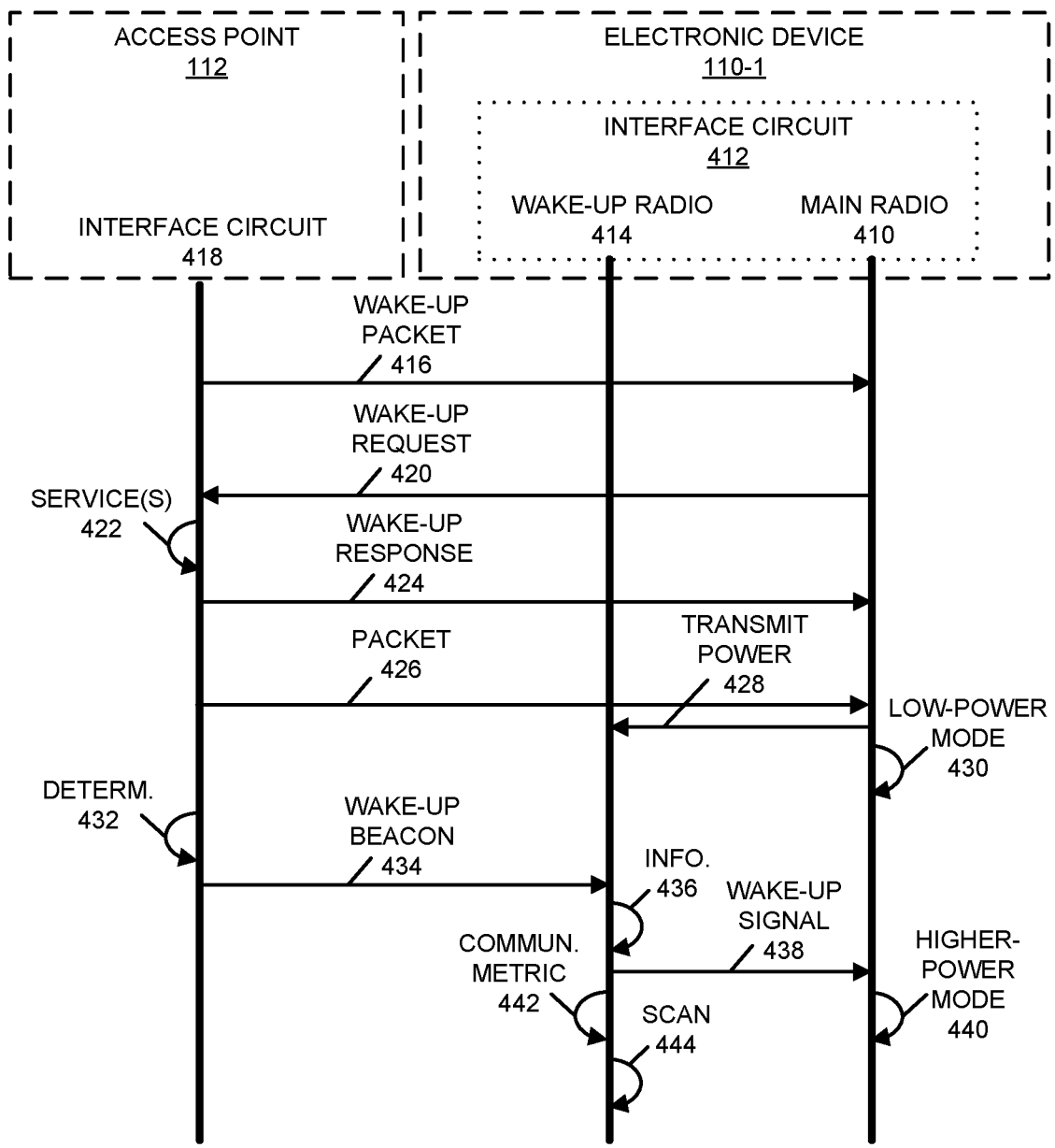
FIG. 4 is a flow diagram illustrating an example of communication between electronic devices, such as the electronic devices of FIG. 1.

The communication technique is further illustrated in FIG. 4, which presents a flow diagram illustrating an example of communication between electronic device 110-1 and access point 112. After associating with access point 112, interface circuit 418 in access point 112 may provide a wake-up packet 416 for electronic device 110-1 that includes information specifying one or more services offered by access point 112. After receiving wake-up packet 416, main radio 410 (such as radio 114-1) in interface circuit 412 in electronic device 110-1 may transmit a wake-up request 420 to access point 112 that specifies one or more types of services 422 for which electronic device 110-1 will awaken main radio 410. In response, interface circuit 418 provides a wake-up response 424 (such as an acknowledgment to wake-up request 420 to electronic device 110-1). In some embodiments, interface circuit 418 optionally provides a packet 426 (or a frame) to electronic device 110-1 that includes information specifying a transmit power 428 of interface circuit 418. Main radio 410 may provide the information to a wake-up radio 414 (such as wake-up radio 118-1) in interface circuit 412.

Subsequently, main radio 410 may transition to a low-power mode 430. Next, interface circuit 418 may determine 432 to provide wake-up beacon 434 for wake-up radio 414. For example, interface circuit 418 may determine 432 to provide wake-up beacon 434 when there is downlink traffic (such as data associated with a service) for electronic device 110-1. Moreover, interface circuit 418 may provide wake-up beacon 434 associated with a predefined sub-channel in one or more channels in a band of frequencies, where wake-up beacon 434 is provided within an associated time interval (such as a keep-alive interval of access point 112).

In some embodiments, wake-up beacon 434 includes a field with information 436. For example, information 436 may include channel information that specifies one or more second channels used by main radio 410. Note that the one or more second channels may be different from the one or more channels. Alternatively or additionally, information 436 may include service information that specifies one or more types of services. For example, the service information may be hashed using a predefined hash function and/or the service information may include vendor information. Furthermore, information 436 may a transmit power of interface circuit 418. The transmit power may be different from another wake-up beacon provided by interface circuit 418.

After receiving wake-up beacon 434, wake-up radio 414 may extract and analyze information 436. Then, wake-up radio 414 may perform a remedial action. For example, wake-up radio 414 may provide, to main radio 410, a wake-up signal 438 that transitions main radio 410 from low-power mode 430 to a higher-power mode 440 based at least in part on wake-up beacon 434. Alternatively or additionally, wake-up radio 414 may determine a communication metric 442 based at least in part on a transmit power of wake-up beacon 434 (which may be transmit power 428 and/or the transmit power specified in information 436) and the RSS associated with wake-up beacon 434. Based at least in part on communication metric 442 (such as a comparison of communication metric 442 and the RSS or when the RSS is a predefined fraction of transmit power 428), wake-up radio 414 may perform a scan 444 for a second wake-up beacon associated with a second electronic device in a second predefined sub-channel in one or more second channels in a second band of frequencies.

In some embodiments, when wake-up radio 414 does not receive a wake-up beacon (such as wake-up beacon 434 or a subsequent wake-up beacon) within a subsequent time interval, wake-up radio 414 may perform a scan for the second wake-up beacon associated with the second electronic device in the second predefined sub-channel in the one or more second channels in the second band of frequencies.

Figure 5:
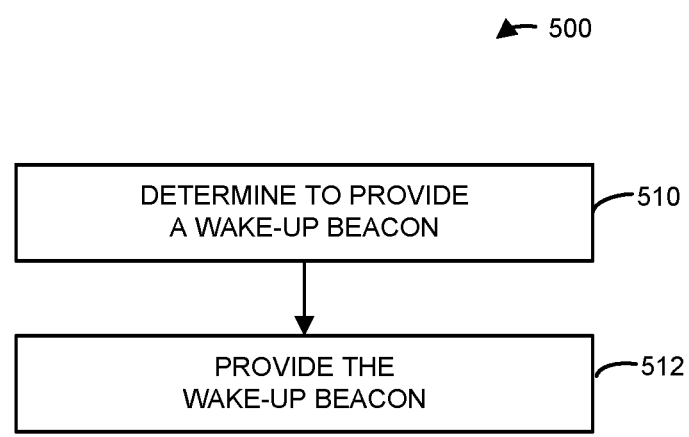
FIG. 5 is a flow diagram illustrating an example method for providing a wake-up beacon using one of the electronic devices in FIG. 1.

FIG. 5 presents a flow diagram illustrating an example method 500 for providing a wake-up beacon. This method may be performed by an electronic device, such as an interface circuit in access point 112 in FIG. 1. During operation, the interface circuit may determine to provide the wake-up beacon (operation 510) for a wake-up radio in a recipient electronic device with information indicating that the recipient electronic device is to awaken a main radio to receive a beacon with DFS information associated with a band of frequencies. Then, the interface circuit may provide the wake-up beacon (operation 512) for the wake-up radio in the recipient electronic device.

Figure 6:
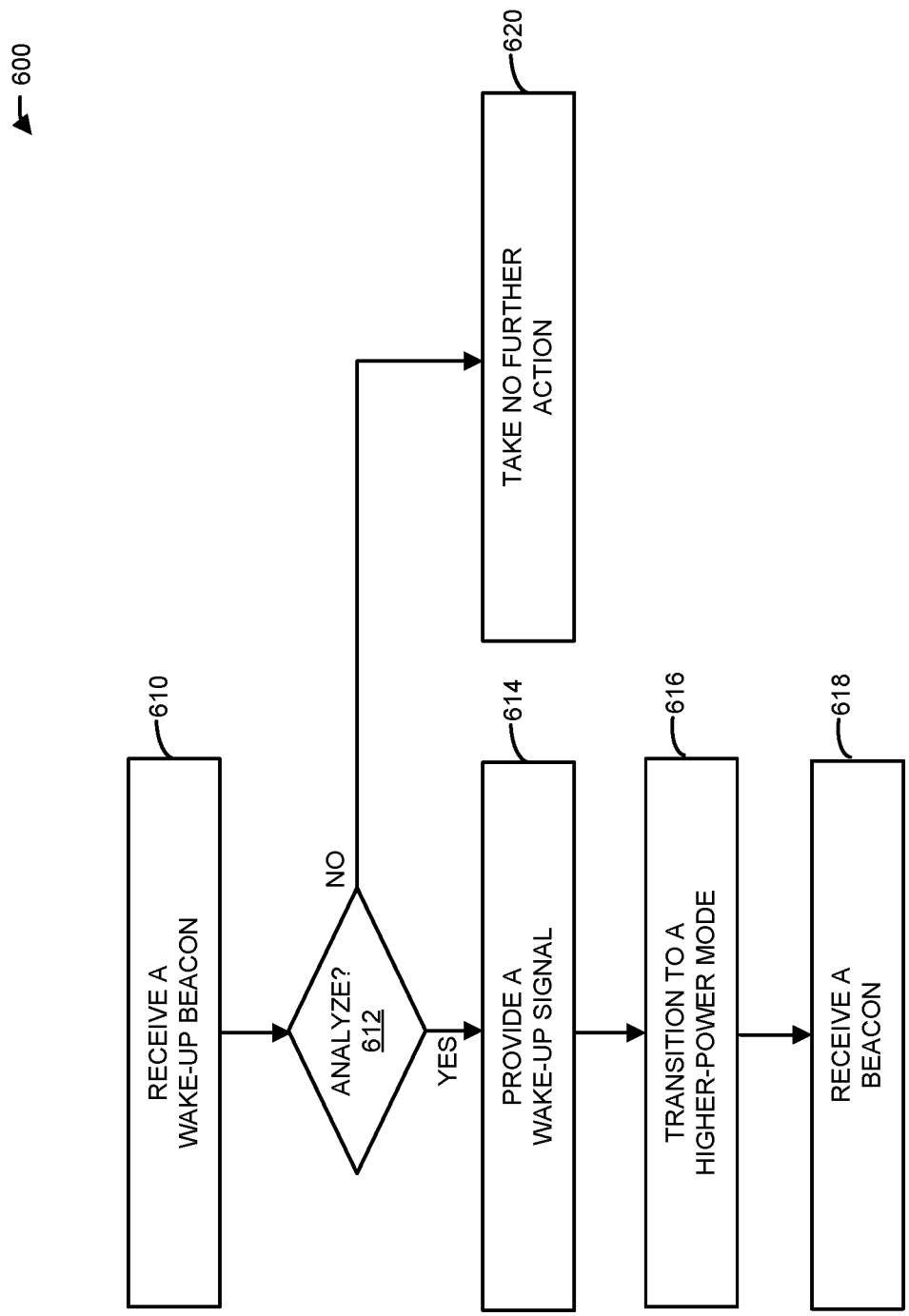
FIG. 6 is a flow diagram illustrating an example method for receiving a wake-up beacon using one of the electronic devices in FIG. 1.

FIG. 6 presents a flow diagram illustrating an example method 600 for receiving a wake-up beacon. This method may be performed by a recipient electronic device, such as an interface circuit in electronic device 110-1 in FIG. 1. This interface circuit may include a wake-up radio and a main radio. During operation, the wake-up radio may receive the wake-up beacon (operation 610) associated with the electronic device (such as from the electronic device). Then, the wake-up radio may optionally analyze the wake-up beacon (operation 612) to determine whether to wake up the main radio. If yes (operation 612), the wake-up radio may provide, to the main radio, a wake-up signal (operation 614) that transitions (operation 616) the main radio from a low-power mode to a higher-power mode based at least in part on the wake-up beacon. Moreover, the main radio may receive a beacon (operation 618) associated with the electronic device (such as from the electronic device) with the DFS information associated with the band of frequencies. Otherwise (operation 612), the wake-up radio may not take further action (operation 620).

In some embodiments of methods 500 (FIG. 5) and/or 600, there may be additional or fewer operations. Moreover, the order of the operations may be changed, and/or two or more operations may be combined into a single operation or performed at least partially in parallel.

In some embodiments, at least some of the operations in methods 500 (FIG. 5) and/or 600 are performed by an interface circuit in the electronic device. For example, at least some of the operations may be performed by firmware executed by an interface circuit, such as firmware associated with a MAC layer, as well as one or more circuits in a physical layer in the interface circuit.

Figure 7:
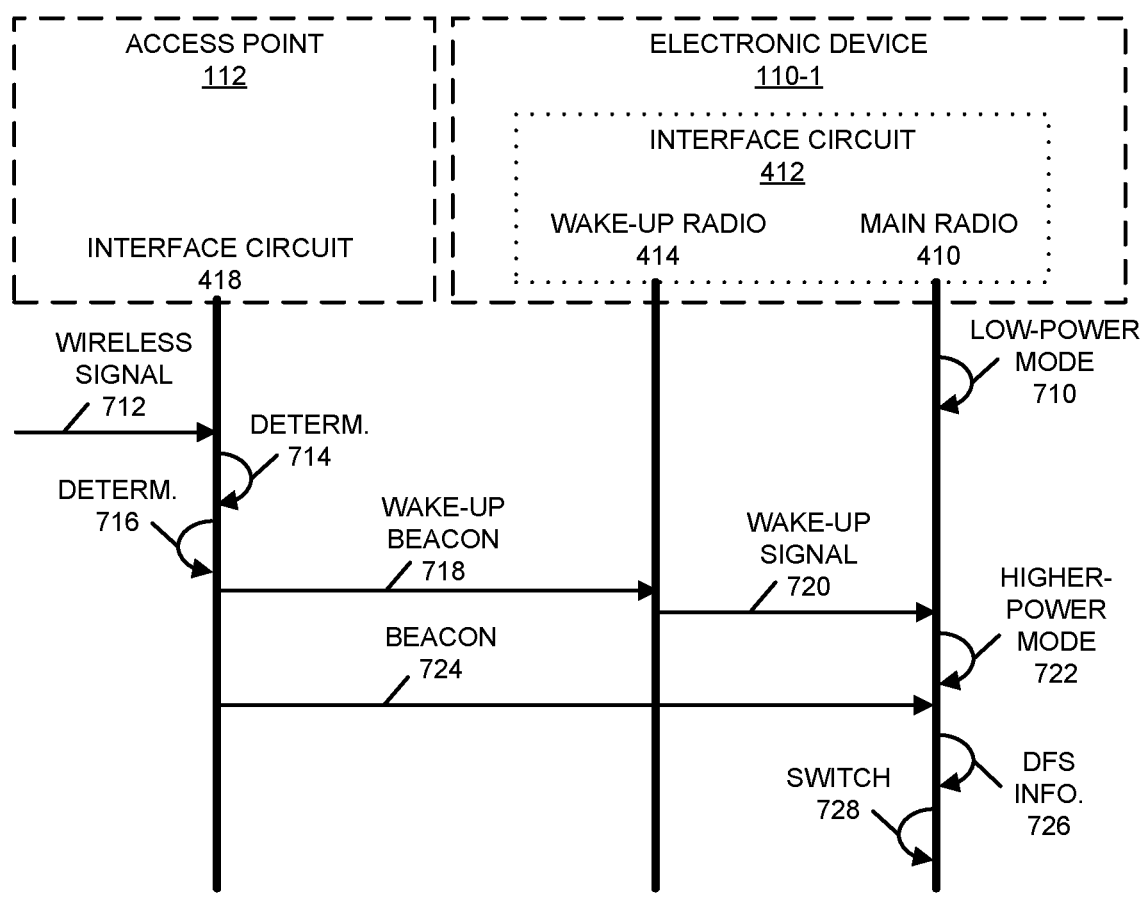
FIG. 7 is a flow diagram illustrating an example of communication between electronic devices, such as the electronic devices of FIG. 1.

The communication technique is further illustrated in FIG. 7, which presents a flow diagram illustrating an example of communication between electronic device 110-1 and access point 112. Notably, after associating with access point 112, main radio 410 in interface circuit 412 in electronic device 110-1 may transition to a low-power mode 710.

Subsequently, interface circuit 418 may receive wireless signals 712 in a band of frequencies. Based at least in part on wireless signals 712, interface circuit 418 may determine 714 that main radio 410 cannot continue to use at least a portion of the band of frequencies. Consequently, interface circuit 418 may determine 716 provide wake-up beacon 718 for a wake-up radio 414 in interface circuit 412 with information indicating that electronic device 110-1 is to awaken main radio 410 to receive a beacon 724 with DFS information 726 associated with the band of frequencies. Then, interface circuit 418 may provide wake-up beacon 718 for wake-up radio 414.

Next, wake-up radio 414 may receive wake-up beacon 718. In response, wake-up radio 414 may provide, to main radio 410, a wake-up signal 720 that transitions main radio 410 from low-power mode 710 to a higher-power mode 722 based at least in part on wake-up beacon 718.

Subsequently, interface circuit 418 may provide beacon 724 with DFS information 726 for main radio 410. Based at least in part on DFS information 726, main radio 410 may discontinue using at least a portion of the band of frequencies. For example, main radio 410 may switch 728 to another channel.

In some embodiments of the LP-WUR radio technology, the communication technique is used to maintain an existing connection between an access point and a recipient electronic device, to perform scans more efficiently and/or to reduce power consumption. When a main radio of a recipient electronic device (which is sometimes referred to as a 'station') is in deep sleep mode for a very long time, the recipient electronic device can roam out range of an associated access point and may need to transition to another access point.

In order to discover which access point to associate with, the recipient electronic device may need to wake up the main radio to perform network/service discovery, which usually involves scanning through multiple channels, and performing multiple frame exchanges. For example, as noted previously, each channel scan may take, e.g., 100 ms to receive one or more beacons. Moreover, the frames exchanged may include: a probe request/response, an authentication request/response, an association request/response; and/or a service information request/response. Waking up the main radio to conduct these frame exchanges can consume more power and may increase a delay in the operation of the recipient electronic device. Consequently, these challenges may degrade the communication performance, which can negatively impact user experience.

Figure 8:
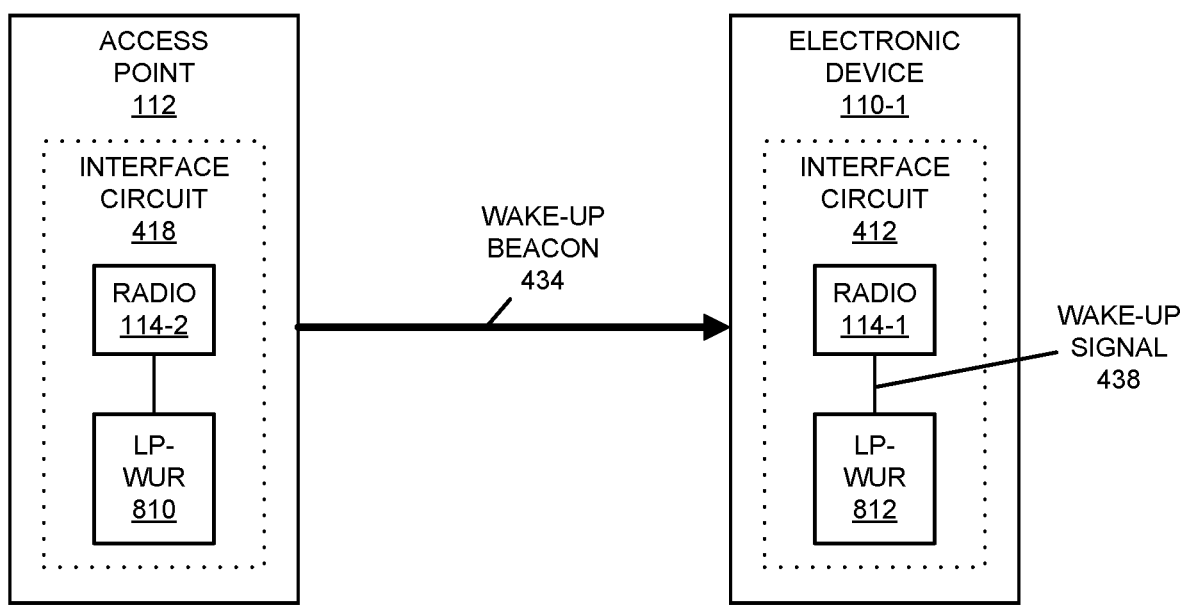
FIG. 8 is a drawing illustrating an example interface circuit in one of the electronic devices in FIG. 1.

In order to address these challenges, in the communication technique a LP-WUR or wake-up beacon may be used to selectively wake-up the main radio in at least the recipient electronic device. As shown in FIG. 8, which presents a drawing illustrating an example of an interface circuit 412 in electronic device 110-1, in the communication technique a LP-WUR 812 (such as wake-up radio 414) may be a companion radio to a main (Wi-Fi) radio 114-1 in interface circuit 412. LP-WUR 812 may allow electronic device 110-1 to turn off main radio 114-1, e.g., whenever possible. Moreover, LP-WUR 812 may wake up main radio 114-1 when wake-up beacon 434 (such as a LP-WUR beacon), sent from optional LP-WUR 810 or radio 114-2 in access point 112, specifies electronic device 110-1. Note that in some embodiments LP-WUR 812 is configured to receive wireless signals, while main radio 114-1 is configured to transmit and to receive wireless signals. In these ways, the power consumption of LP-WUR 812 may be very low, e.g., lower than Bluetooth Low Energy. LP-WUR 812 can operate in an always-on mode and/or in a duty-cycle mode. For example, in the duty-cycle mode, LP-WUR 812 may turn on or listen for a wake-up beacon from access point 112 based at least in part on a keep-alive interval of access point 112.

In such a basic service set (BSS) initiated transition trigger, electronic device 110-1 may use wake-up beacon 434 (or its absence) to determine when to transition to a different BSS. For example, based at least in part on a maximum wake-up beacon interval (such as the keep-alive interval of access point 112), electronic device 110-1 may determine when to scan for another access point. Therefore, access point 112 may send a wake-up beacon or a regular WUR wake-up packet to electronic device 110-1 within this interval. If electronic device 110-1 does not receive anything from access point 112 within the time interval, then electronic device 110-1 may infer that it has roamed out of range of access point 112 and that it needs to discover another access point (e.g., it needs to start an active scan).

Moreover, in order to facilitate fast scanning in a LP-WUR, one or more, e.g., fixed 20 MHz channels (e.g., channel 6) may be defined in which access point 112 is allowed to send a wake-up beacon. Note that the wake-up beacon may be communicated in a narrow band (or sub-channel) or multiple narrow bands in such a 20 MHz channel. For example, a predefined sub-channel may include a middle, narrow tone in a 20 MHz channel. In some embodiments, the wake-up beacon includes information that specifies the operating channel information for the main radio and/or service/vendor information. As described further below, the wake-up beacon may include hashed information, such as a hashed value of a service set identifier (SSID) of electronic device 110-1.

The LP-WUR may also facilitate service discovery. For example, simplified service information may be included in a wake-up beacon so electronic device 110-1 can discovery the service it desires without waking up the main radio. Moreover, the wake-up beacon may optionally include transmit power information to help electronic device 110-1 estimate the distance between access point 112 and electronic device 110-1 in order to facilitate BSS transition (e.g., to assist electronic device 110-1 in determining when to start an active scan).

Figure 9:
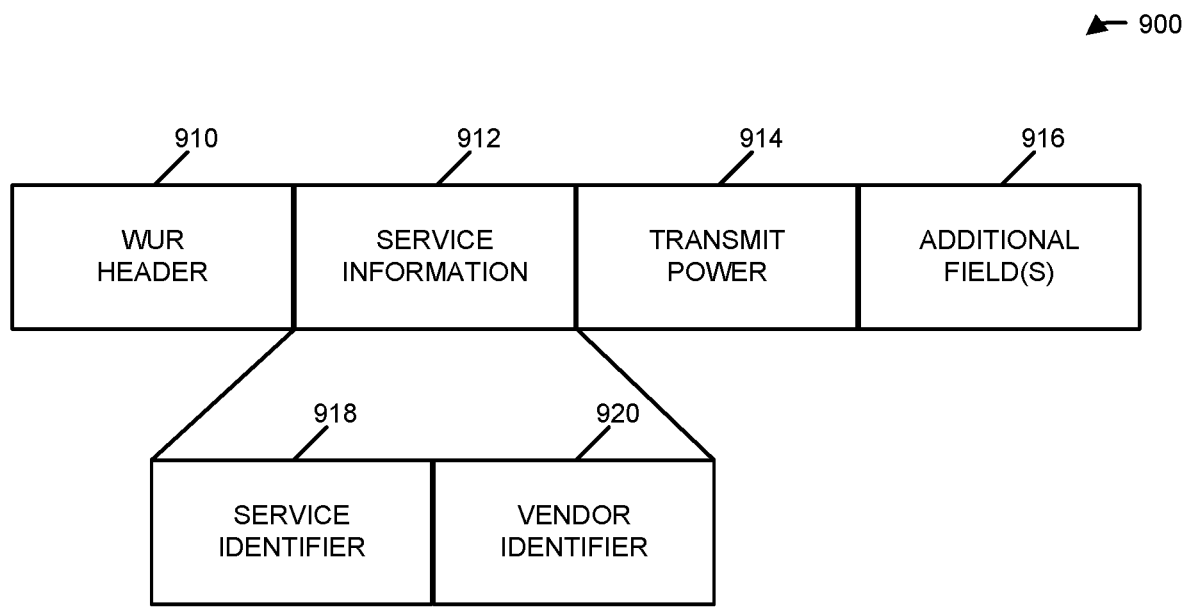
FIGS. 9-11 are drawings illustrating example wake-up beacons.

FIG. 9 presents a drawing illustrating an example wake-up beacon 900 (which may be a special type of LP-WUR packet). This wake-up beacon may have a packet format that supports service discovery on or via a LP-WUR. Notably, wake-up beacon 900 may include and/all of: a wake-up-radio header 910, a service-information field 912, an optional transmit power 914, and/or one or more additional fields 916. Service-information field 912 may include information such as a service identifier 918 subfield and/or a vendor identifier 920 subfield for a provider of a service. The service identifier may be defined for different services. Thus, service identifier 918 may specify one or more types of services. For example, a cable service may use a service identifier of '0000', a television service may use service identifier '0001', etc. As noted previously, at least some of the information in wake-up beacon 900 (such as an SSID) may be hashed using a predefined hash function (e.g., the hash function may be defined in an IEEE standard, such as IEEE 802.11BA, so that access point 112 and electronic device 110-1 use the same hash function). This is because wake-up beacon 900 may have a low data rate (e.g., the modulation may include on-off keying or OOK, or similar modulation that has a very low data rate, such as, e.g., 250 kbps). Therefore, it may be advantageous for service-information field 912 to include a smaller number of bits. Consequently, one or more hash functions may be used to reduce the number of bits that are needed.

As noted previously, wake-up beacon 900 may facilitate service discovery and wake up. For example, access point 112 and electronic device 110-1 may negotiate which service identifier(s) and/or vendor identifier(s) will be used to wake up the main radio using a LP-WUR request frame and a LP-WUR response frame. When electronic device 110-1 sends the LP-WUR request, it may include the specific service identifier and/or the vendor identifier that it wishes to be notified using a wake-up beacon. In response, access point 112 may send a LP-WUR response frame. Subsequently, access point 112 may send a wake-up beacon to electronic device 110-1 when it has traffic for the particular services and/or vendors. Thus, electronic device 110-1 may only wake up its main radio for a particular service from a particular vendor, and more generally based at least in part on one or more wake-up criteria. Note that access point 112 can also send a broadcast LP-WUR packet to broadcast the one or more types of services provided by access point 112 to electronic devices 110 in its BSS. In other embodiments, the order of items in the wake-up beacon 900 can vary and additional and/or different items can be included.

In some embodiments, transmit-power information for access point 112 is used for the BSS transition. Notably, in order to facilitate the BSS transition, access point 112 can notify electronic device 110-1 of the transmission power used to send or transmit the LP-WUR packet or the wake-up beacon (such as optional transmit power 914 in wake-up beacon 900), and electronic device 110-1 can use the RSS together with the transmit power to calculate the path loss and distance between electronic device 110-1 and access point 112 (either of which may be examples of the communication metric) without waking up the main radio. Note that the transmit power used by access point 112 for communicating with the LP-WUR and the main radio can be different.

Figure 10:
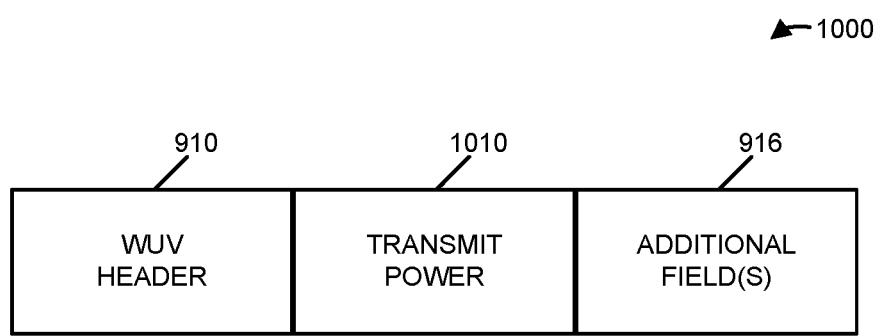

Alternatively or additionally, access point 112 can notify electronic device 110-1 of the transmit power for the wake-up beacons when electronic device 110-1 negotiates the LP-WUR mode with access point 112, in which case the transmit power may have a semi-static value. However, in some embodiments the transmit power is included in the wake-up beacon, in which case the transmit power used to send the wake-up beacon or a LP-WUR packet can be dynamically changed for each wake-up beacon or LP-WUR packet. FIG. 10 presents a drawing illustrating an example wake-up beacon 1000, with a subfield that includes information specifying transmit power 1010.

Using the transmit power and the RSS for the wake-up beacon, electronic device 110-1 may determine a communication metric. Moreover, based at least in part on the determined communication metric, electronic device 110-1 may determine it needs to perform an active scan. For example, access point 112 may notify electronic device 110-1 of its coverage distance (such as a distance of, e.g., 30 m) while they negotiate the LP-WUR mode (such as by exchanging the wake-up request and the wake-up reply). Then, when electronic device 110-1 determines that the distance to access point 112 is larger than the coverage distance, electronic device 110-1 may perform an active scan. Alternatively or additionally, electronic device 110-1 may determine whether to perform an active scan based at least in part on a transmit power and/or an RSS, such as based at least in part on a threshold of, e.g., −82 dBm, −90 dBm or −100 dBm. In other embodiments, the order of items in wake-up beacon 1000 can vary and additional and/or different items can be included.

Figure 11:
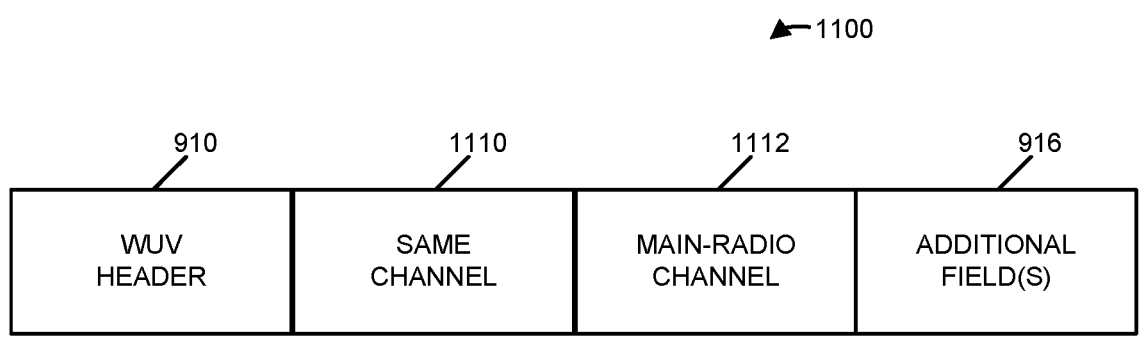

In some embodiments, channel information is included in the wake-up beacon. For example, the channel information may indicate whether the main radio is on a different channel from the wake-up beacon. If the main radio and the LP-WUR do not use the same channel then the wake-up beacon may indicate channel number for the main radio. FIG. 11 presents a drawing illustrating an example wake-up beacon 1100, including an indication whether the main radio and the LP-WUR use the same channel 1110 and/or a main-radio channel 1112 (such as a channel number for the main radio).

Furthermore, in some embodiments the wake-up beacon includes a check-beacon field. Notably, because the wake-up beacon may have a very low data rate (such as a data rate associated with on-off keying modulation), it may be difficult to convey some system-update information in this radio, such as: channel switch announcement, quiet channel announcement etc. In order for electronic device 110-1 to get this system-update information, the wake-up beacon may include a check-beacon field to notify electronic device 110-1 to wake up the main radio to receive a beacon using the main radio. For example, the check-beacon field may include, e.g., a one-bit indication. This indication may indicate that access point 112 need to leave a DFS channel or has to quiet electronic device 110-1. Thus, the wake-up beacon may indicate that the main radio needs to scan for DFS and/or needs to switch channels. In other embodiments, the order of items in wake-up beacon 1100 can vary and additional and/or different items can be included.

In summary, a wake-up beacon may be used to allow electronic device 110-1 to selectively transition to the higher-power mode and/or to enable fast BSS discovery via a LP-WUR. This wake-up beacon may be communicated using, e.g., a fixed 20 MHz channel. Alternatively, the wake-up beacon may be communicated using, e.g., a fixed narrowband WUR channel within the 20 MHz. Moreover, the wake-up beacon or another LP-WUR packet may include service information to help electronic device 110-1 discover services and/or to facilitate a BSS transition. The service information may include a service identifier and/or vendor information. Furthermore, the service information may be sent using one or more hash functions to reduce the number of bits. The specific service identifier and/or the vendor identifier that are used to wake up electronic device 110-1 can be requested and agreed with access point 112. Additionally, the wake-up beacon may include channel information for the main radio, which may allow electronic device 110-1 to receive the main-radio beacon faster. In some embodiments, access point 112 provides the transmit power to electronic device 110-1 in order to help electronic device 110-1 decide whether to transition to a different access point or to which access point to transition. The transmit-power information can be sent to the main radio or can be included in the wake-up beacon, in which case the transmit power can be dynamically changed. In some embodiments, in order to help electronic device 110-1 discover system-update information, the wake-up beacon includes a check-beacon field. When the check-beacon field is set, electronic device 110-1 may need to wake up the main radio to receive the main beacon.

While access point 112 woke up main radio 114-1 using wake-up beacon 434 in the preceding example, in some embodiments wake-up beacon 434 may be used to wake up main radios (and, more generally, to convey information to) one or more recipient electronic devices. For example, during the communication technique, access point 112 may define a group of one or more recipient electronic devices and may use a single wake-up beacon to wake up the main radios in the group of recipient electronic devices. However, the recipient electronic devices in the group may not all have traffic when the group wake-up beacon is received. Consequently, the wake-up beacon may include a group wake-up indication map (WIM) that is carried or conveyed in the wake-up beacon. The group-WIM may be a bitmap that is used to indicate which recipient electronic devices are being awakened (such as a subset of the group of recipient electronic devices). For example, in some embodiments, if there are ten recipient electronic devices in a group, then the group-WIM may be, e.g., a 10-bit field. In other embodiments, other mapping schemes or techniques can be used.

In general, access point 112 may group recipient electronic devices into a wake-up group based at least in part on one or more criteria. For example, access point 112 may define a group based at least in part on recipient electronic devices that have similar keep-alive intervals and/or that have previously specific a common service for which they will wake up their main radios.

We now describe embodiments of an electronic device. FIG. 12 presents a block diagram of an electronic device 1200 (which may be a cellular telephone, an access point, another electronic device, etc.) in accordance with some embodiments. This electronic device includes processing subsystem 1210, memory subsystem 1212, and networking subsystem 1214. Processing subsystem 1210 includes one or more devices configured to perform computational operations. For example, processing subsystem 1210 can include one or more microprocessors, application-specific integrated circuits (ASICs), graphics processing units (GPUs), microcontrollers, programmable-logic devices, and/or one or more digital signal processors (DSPs).

Memory subsystem 1212 includes one or more devices for storing data and/or instructions for processing subsystem 1210 and networking subsystem 1214. For example, memory subsystem 1212 can include dynamic random access memory (DRAM), static random access memory (SRAM), a read-only memory (ROM), flash memory, and/or other types of memory. In some embodiments, instructions for processing subsystem 1210 in memory subsystem 1212 include: program instructions or sets of instructions (such as program instructions 1222 or operating system 1224), which may be executed by processing subsystem 1210. For example, a ROM can store programs, utilities or processes to be executed in a non-volatile manner, and DRAM can provide volatile data storage, and may store instructions related to the operation of electronic device 1200. Note that the one or more computer programs may constitute a computer-program mechanism, a computer-readable storage medium or software. Moreover, instructions in the various modules in memory subsystem 1212 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1210. In some embodiments, the one or more computer programs are distributed over a network-coupled computer system so that the one or more computer programs are stored and executed in a distributed manner.

In addition, memory subsystem 1212 can include mechanisms for controlling access to the memory. In some embodiments, memory subsystem 1212 includes a memory hierarchy that comprises one or more caches coupled to a memory in electronic device 1200. In some of these embodiments, one or more of the caches is located in processing subsystem 1210.

In some embodiments, memory subsystem 1212 is coupled to one or more high-capacity mass-storage devices (not shown). For example, memory subsystem 1212 can be coupled to a magnetic or optical drive, a solid-state drive, or another type of mass-storage device. In these embodiments, memory subsystem 1212 can be used by electronic device 1200 as fast-access storage for often-used data, while the mass-storage device is used to store less frequently used data.

Figure 12:
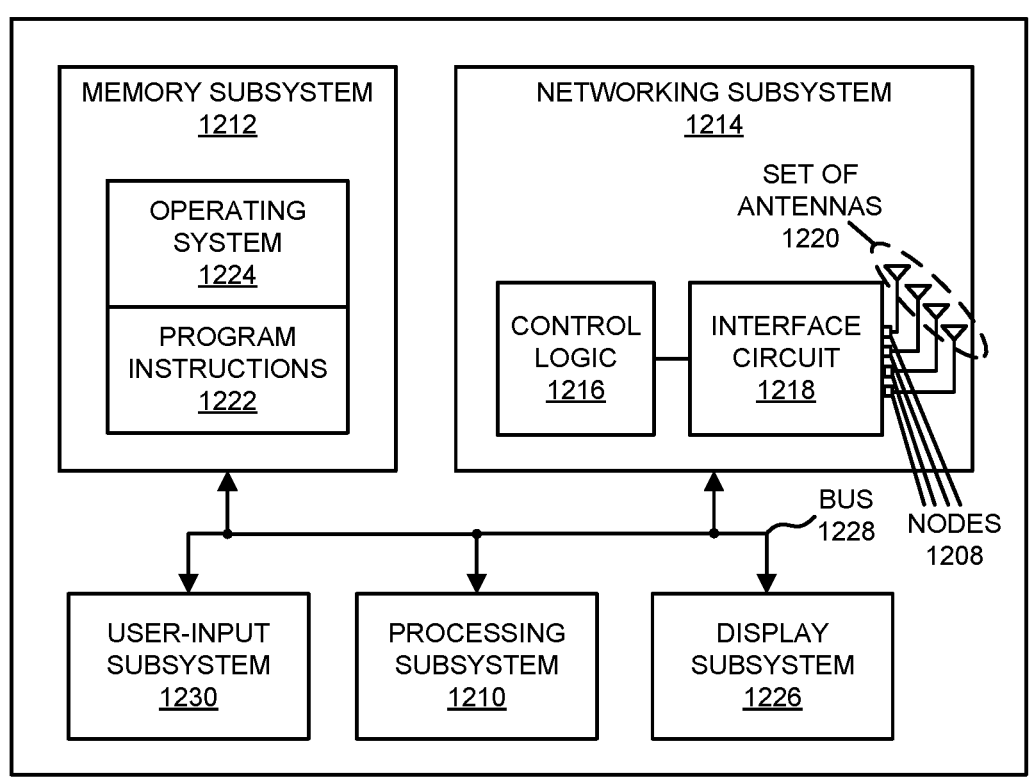
FIG. 12 is a block diagram illustrating an example of one of the electronic devices of FIG. 1.

Networking subsystem 1214 includes one or more devices configured to couple to and communicate on a wired and/or wireless network (i.e., to perform network operations), including: control logic 1216, an interface circuit 1218 and a set of antennas 1220 (or antenna elements) in an adaptive array that can be selectively turned on and/or off by control logic 1216 to create a variety of optional antenna patterns or 'beam patterns.' (While FIG. 12 includes set of antennas 1220, in some embodiments electronic device 1200 includes one or more nodes, such as nodes 1208, e.g., a pad, which can be coupled to set of antennas 1220. Thus, electronic device 1200 may or may not include set of antennas 1220.) For example, networking subsystem 1214 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

In some embodiments, networking subsystem 1214 includes one or more radios, such as a wake-up radio that is used to receive wake-up beacons, and a main radio that is used to transmit and/or receive frames or packets during a higher-power mode. The wake-up radio and the main radio may be implemented separately (such as using discrete components or separate integrated circuits) or in a common integrated circuit.

Networking subsystem 1214 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1200 may use the mechanisms in networking subsystem 1214 for performing simple wireless communication between the electronic devices, e.g., transmitting advertising or beacon frames and/or scanning for advertising frames transmitted by other electronic devices.

Within electronic device 1200, processing subsystem 1210, memory subsystem 1212, and networking subsystem 1214 are coupled together using bus 1228 that facilitates data transfer between these components. Bus 1228 may include an electrical, optical, and/or electro-optical connection that the subsystems can use to communicate commands and data among one another. Although only one bus 1228 is shown for clarity, different embodiments can include a different number or configuration of electrical, optical, and/or electro-optical connections among the sub systems.

In some embodiments, electronic device 1200 includes a display subsystem 1226 for displaying information on a display, which may include a display driver and the display, such as a liquid-crystal display, a multi-touch touchscreen, etc. Display subsystem 1226 may be controlled by processing subsystem 1210 to display information to a user (e.g., information relating to incoming, outgoing, or an active communication session).

Electronic device 1200 can also include a user-input subsystem 1230 that allows a user of the electronic device 1200 to interact with electronic device 1200. For example, user-input subsystem 1230 can take a variety of forms, such as: a button, keypad, dial, touch screen, audio input interface, visual/image capture input interface, input in the form of sensor data, etc.

Electronic device 1200 can be (or can be included in) any electronic device with at least one network interface. For example, electronic device 1200 may include: a cellular telephone or a smartphone, a tablet computer, a laptop computer, a notebook computer, a personal or desktop computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 1200, in alternative embodiments, different components and/or subsystems may be present in electronic device 1200. For example, electronic device 1200 may include one or more additional processing subsystems, memory subsystems, networking subsystems, and/or display subsystems. Additionally, one or more of the subsystems may not be present in electronic device 1200. Moreover, in some embodiments, electronic device 1200 may include one or more additional subsystems that are not shown in FIG. 12. Also, although separate subsystems are shown in FIG. 12, in some embodiments some or all of a given subsystem or component can be integrated into one or more of the other subsystems or component(s) in electronic device 1200. For example, in some embodiments program instructions 1222 are included in operating system 1224 and/or control logic 1216 is included in interface circuit 1218.

Moreover, the circuits and components in electronic device 1200 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1214. This integrated circuit may include hardware and/or software mechanisms that are used for transmitting wireless signals from electronic device 1200 and receiving signals at electronic device 1200 from other electronic devices. Aside from the mechanisms herein described, radios are generally known in the art and hence are not described in detail. In general, networking subsystem 1214 and/or the integrated circuit can include any number of radios. Note that the radios in multiple-radio embodiments function in a similar way to the described single-radio embodiments.

In some embodiments, networking subsystem 1214 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 1222, operating system 1224 (such as a driver for interface circuit 1218) or in firmware in interface circuit 1218. Alternatively or additionally, at least some of the operations in the communication technique may be implemented in a physical layer, such as hardware in interface circuit 1218. In some embodiments, the communication technique is implemented, at least in part, in a MAC layer and/or in a physical layer in interface circuit 1218.

While examples of numerical values are provided in the preceding discussion, in other embodiments different numerical values are used. Consequently, the numerical values provided are not intended to be limiting.

While the preceding embodiments illustrated the use of a wake-up beacon that is communicated using Wi-Fi, in other embodiments of the communication technique Bluetooth Low Energy is used to communicate the wake-up beacon. Furthermore, the wake-up beacon may be communicated in the same or a different band of frequencies that the band(s) of frequencies used by the main radio. For example, the wake-up beacon may be communicated in one or more bands of frequencies, including: 900 MHz, 2.4 GHz, 5 GHz, 60 GHz, and/or a band of frequencies used by LTE.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
a node configured to communicatively couple to an antenna; and
an interface circuit, communicatively coupled to the node, configured to communicate with a recipient electronic device, and configured to:
provide, to the node, a wake-up beacon associated with a predefined sub-channel in one or more channels in a band of frequencies, wherein the wake-up beacon is for a wake-up radio in the recipient electronic device;
wherein the wake-up beacon is provided within an associated time interval that corresponds to a keep-alive interval of the electronic device beyond which the recipient electronic device is to scan for another electronic device;
wherein the wake-up beacon comprises a field that comprises service information specifying one or more types of services associated with the electronic device and specifying vendor information for a provider of a service; and
wherein the electronic device has received an indication associated with the recipient electronic device indicating that the recipient electronic device will awaken a main radio of the recipient electronic device when there is downlink traffic associated with the one or more types of services.

2. The electronic device of claim 1, wherein the electronic device comprises an access point.

3. The electronic device of claim 1, wherein the wake-up beacon comprises a Low Power Wake Up Radio (LP-WUR) packet.

4. The electronic device of claim 1, wherein the wake-up beacon comprises a field that comprises channel information specifying one or more second channels used by a main radio in the recipient electronic device; and
wherein the one or more second channels are different from the one or more channels.

5. The electronic device of claim 1, wherein, prior to providing the wake-up beacon, the interface circuit is configured to:
receive, from the node, a wake-up request associated with the recipient electronic device, the wake-up request comprising the indication that specifies the one or more types of services for which the recipient electronic device will awaken a main radio; and
provide, to the node, a wake-up response addressed to the recipient electronic device based at least in part on the wake-up request.

6. The electronic device of claim 1, wherein the interface circuit is configured to provide, to the node, a wake-up packet addressed to the recipient electronic device that comprises information specifying the one or more services associated with the electronic device.

7. The electronic device of claim 1, wherein the wake-up beacon comprises a field that comprises information specifying a transmit power of the interface circuit.

8. The electronic device of claim 1, wherein, prior to providing the wake-up beacon, the interface circuit is configured to provide, to the node, a packet addressed to the recipient electronic device that comprises information specifying a transmit power of the interface circuit.

9. A recipient electronic device, comprising:
a node configured to communicatively couple to an antenna; and
an interface circuit, communicatively coupled to the node, configured to communicate with an electronic device, wherein the interface circuit comprises a wake-up radio and a main radio, and wherein the wake-up radio is configured to:
receive, from the node and using the wake-up radio, a wake-up beacon associated with a predefined sub-channel in one or more channels in a band of frequencies, wherein the wake-up beacon is associated with the electronic device;
wherein the wake-up beacon is provided within an associated time interval that corresponds to a keep-alive interval of the electronic device beyond which the recipient electronic device is to scan for another electronic device;
wherein the wake-up beacon comprises a field that comprises service information specifying one or more types of services associated with the electronic device and specifying vendor information for a provider of a service; and
wherein the recipient electronic device has provided an indication addressed to electronic device indicating that the recipient electronic device will awaken the main radio when there is downlink traffic associated with the one or more types of services; and
provide, to the main radio, a wake-up signal that transitions the main radio from a low-power mode to a higher-power mode based at least in part on the wake-up beacon comprising the service information.

10. The recipient electronic device of claim 9, wherein the electronic device comprises an access point.

11. The recipient electronic device of claim 9, wherein the wake-up beacon comprises a Low Power Wake Up Radio (LP-WUR) packet.

12. The recipient electronic device of claim 9, wherein the wake-up beacon comprises a field that includes channel information specifying one or more second channels used by the main radio; and
wherein the one or more second channels are different from the one or more channels.

13. The recipient electronic device of claim 9, wherein, prior to receiving the wake-up beacon, the interface circuit is configured to:
provide, to the node, a wake-up request addressed to the electronic device, the wake-up request comprising the indication that specifies one or more types of services for which the recipient electronic device will awaken the main radio; and
receive, from the node, a wake-up response associated with the electronic device based at least in part on the wake-up request.

14. The recipient electronic device of claim 9, wherein the wake-up beacon comprises a field that includes information specifying a transmit power of the electronic device;
wherein the recipient electronic device is configured to determining a communication metric based at least in part on the transmit power and a received signal strength associated with the wake-up beacon; and
wherein, based at least in part on the communication metric, the wake-up radio is configured to perform a scan for a second wake-up beacon associated with a second electronic device in a second predefined sub-channel in one or more second channels in a second band of frequencies.

15. The recipient electronic device of claim 9, wherein, prior to receiving the wake-up beacon, the interface circuit is configured to receive, from the node, a packet associated with the electronic device that comprises information specifying a transmit power of the electronic device.

16. The recipient electronic device of claim 9, wherein, when another wake-up beacon is not received within a subsequent time interval, the wake-up radio is configured to perform a scan for a second wake-up beacon associated with a second electronic device in a second predefined sub-channel in one or more second channels in a second band of frequencies.

17. A method for providing a wake-up beacon, comprising:
by a recipient electronic device:
receiving, using a wake-up radio in the recipient electronic device, the wake-up beacon associated with a predefined sub-channel in one or more channels in a band of frequencies, wherein the wake-up beacon is associated with an electronic device; and
wherein the wake-up beacon is provided within an associated time interval that corresponds to a keep-alive interval of the electronic device beyond which the recipient electronic device is to scan for another electronic device;
wherein the wake-up beacon comprises a field that comprises service information specifying one or more types of services associated with the electronic device and specifying vendor information for a provider of a service; and
wherein the recipient electronic device has provided an indication addressed to electronic device indicating that the recipient electronic device will awaken the main radio when there is downlink traffic associated with the one or more types of services; and
providing, to a main radio in the recipient electronic device, a wake-up signal that transitions the main radio from a low-power mode to a higher-power mode based at least in part on the wake-up beacon comprising the service information.

18. The method of claim 17, wherein the wake-up beacon comprises a field that comprises channel information specifying one or more second channels used by the main radio; and
wherein the one or more second channels are different from the one or more channels.

19. The method of claim 17, wherein, prior to receiving the wake-up beacon, the method comprises:
providing, using the main radio, a wake-up request addressed to the electronic device, the wake-up request comprising the indication that specifies the one or more types of services for which the recipient electronic device will awaken the main radio; and
receiving, using the main radio, a wake-up response associated with the electronic device based at least in part on the wake-up request.

20. The method of claim 17, wherein the method comprises receiving, using the wake-up radio, a wake-up packet associated with the electronic device that comprises information specifying the one or more services associated with the electronic device.

* * * * *